(No Model.)
D. P. JEFFERIES & A. W. GRANT.
TOP SUPPORT FOR CHILDREN'S CARRIAGES.
No. 438,238. Patented Oct. 14, 1890.
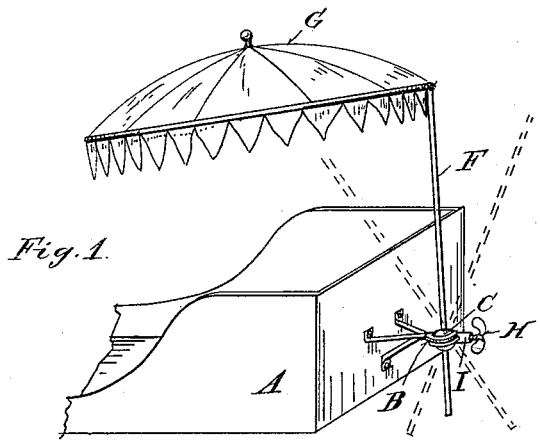
Fig. 1.
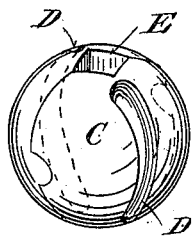
Fig. 4.
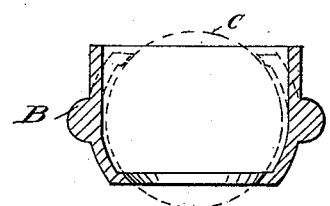
Fig. 5.
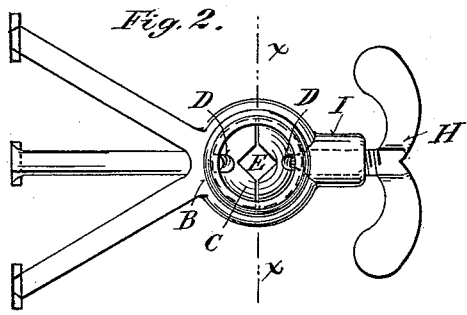
Fig. 2.
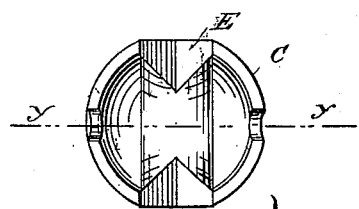
Fig. 6.
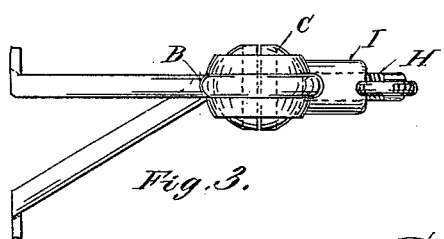
Fig. 3.
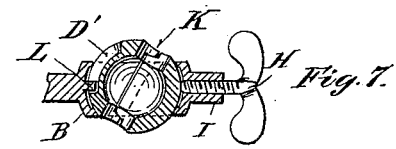
Fig. 7.
Fig. 8.
WITNESSES
H. M. Plaisted
Warren Hull
INVENTORS,
Daniel P. Jefferies and
Arthur W. Grant.
By H. A. Tauduin
their Attorney.

UNITED STATES PATENT OFFICE.

DANIEL P. JEFFERIES AND ARTHUR W. GRANT, OF SPRINGFIELD, OHIO.

TOP-SUPPORT FOR CHILDREN'S CARRIAGES.

SPECIFICATION forming part of Letters Patent No. 438,238, dated October 14, 1890.

Application filed February 17, 1890. Serial No. 340,709. (No model.)

*To all whom it may concern:*

Be it known that we, DANIEL P. JEFFERIES and ARTHUR W. GRANT, citizens of the United States, residing at Springfield, in the county of Clark and State of Ohio, have invented certain new and useful Improvements in Top-Supports for Children's Carriages, of which the following is a specification, reference being had therein to the accompanying drawings.

Our invention relates to certain new and useful improvements in top-support clamps for children's carriages.

Our improvements have reference to making a clamp that will firmly hold the top-support in any adjusted position, but will at once free the same when the clamp is loosened, have reference to providing a divided ball that revolves as one piece, have reference to so securing the said divided ball that it will not become disengaged from the supporting portion, have reference to the provision of an eye or supporting part of the ball, adapted to be closed after the ball is inserted to an extent sufficient to prevent the dislodgment of the ball, and have reference to other matters of detail more fully brought out hereinafter.

In the accompanying drawings, forming a part of this specification, and on which like reference-letters indicate corresponding parts, Figure 1 represents a perspective view of our device attached to a carriage and sustaining the top thereof; Fig. 2, a plan view of our device detached; Fig. 3, a side view of the same; Fig. 4, a perspective view of the divided ball forming the clamping portion; Fig. 5, a section on the line *x x* of Fig. 2, showing the shape of the supporting portion or eye before the divided ball is placed therein, and the second shape thereof indicated in dotted lines; Fig. 6, an inside view of half the divided ball and a cross-section on the line *y y* of the same; Fig. 7, a vertical sectional view along the axis of a set-screw, showing a modified form of ball and a guiding-pin therefor; and Fig. 8, an elevation of still another modified form of a divided ball.

The letter A designates the body of a baby-carriage, for instance, to the back of which our device is secured by screws or otherwise through the feet of a supporting portion having an annular socket B with interior curved walls, in which is loosely and adjustably mounted a divided ball C, having a bearing groove or depression B, and an angular hole E passing axially through the ball to grip the support F of a top G, located above the said carriage. This ball is preferably made in two symmetrical interlocking halves, each having half the angular hole formed axially therein, and a projection and a notch on opposite sides thereof, so that when two halves are correctly opposed to each other the projection of each half will enter its corresponding notch in the other. The bearing-groove D is formed on each half; but only one groove is engaged by a set-screw H, turning in a boss I on the said annular socket B. The divided ball has sufficient play in its socket to open and enlarge the angular hole for the admission and release of the support F, while the point of the set-screw projecting into the said groove on one side will prevent the ball from ever presenting the dividing-line thereof to the point of the screw, while at the same time the ball can freely revolve in every direction.

The advantage of the angular hole is that the support will be firmly held by the angular sides of the said hole when the set-screw compresses the divided ball, yet will free the support at once without its sticking in the hole when the set-screw releases its pressure on the said ball. This is a point of considerable merit and convenience, as contrivances before used in clamps have given much trouble in this respect.

The interlocking feature in the divided ball is another point of especial note, as the ball can be turned in any direction without the halves losing their correct apposition, and one pattern only is necessary to cast the ball. The groove on the side opposite from the set-screw is not used in the preferred form, but results from the halves being symmetrical and cast from one pattern.

The complete ball may be cast in one pattern and partially divided, as shown in Fig. 8, and also the angular hole may be located at one side from the axis, as illustrated in the same figure. In this modification the spring of the material at J allows the ball to grip the top-support.

Another modification is shown in Fig. 7, in which the set-screw acts on the plain surface of the ball, the halves are matched on the dividing-line, as shown at K, and a groove D' receives a projection L from the wall of the annular socket to prevent the dividing-line coming opposite the set-screw.

We will now describe how the ball is preferably secured in the socket so that it will not become dislodged. The socket is first cast in malleable metal in the shape shown in Fig. 5, having the wall straight for a portion of its depth and curved inward at the bottom, as shown. The divided ball is then placed in position, as indicated by the dotted lines, and the top of the socket is compressed to a smaller diameter of opening, so as to embrace the ball loosely, as indicated by the dotted lines, Fig. 5, yet prevent its escaping therefrom.

It will be seen from Fig. 5 that the contact between the ball and the socket is at the contracted portions of the latter, while around the central zone of the socket the ball is not in contact. By this arrangement the friction created by the pressure of the set-screw is sufficiently remote from the axial line of the screw to give a leverage, which prevents the ball from any liability to turn away from the screw by any moderate pressure exerted by the same.

Thus it will be seen that by our device a top-support can be rigidly secured in any convenient adjusted position to shade the occupant of the same, and by simply slacking off the set-screw the support will be at once freed from the gripping action of the clamp without sticking in the same, due to the angular form of the said hole. Furthermore, by using but one pattern for the divided ball the construction and use thereof are simplified and the number of different castings lessened.

While we have shown and described our device applied to a carriage and holding a top over the same, we do not wish to be understood as limiting ourselves to this particular use and construction.

Having thus fully described our invention, what we claim as new, and desire to secure by Letters Patent, is—

1. In a clamp, the combination, with a divided ball, of a supporting-annulus having one supporting-zone for the ball formed at one side of its central zone and another zone in said annulus adapted to be contracted about the said ball to alone prevent the escape of the same, and means to compress the divided ball to clamp the contained device, whereby the bearing-zones and compressing means lie in different planes to increase the steadiness of said ball and the annulus is contracted about the ball after the insertion of the same.

2. In a clamp, an annulus having clamping means, its interior consisting of zones of two spheres having different diameters, the bearing-zone being of the smaller sphere and located on either side of the central zone of the larger sphere, one of said outer zones adapted to be contracted about said clamping means, whereby the two bearing-surfaces and an intermediate non-bearing surface are formed to promote the steadiness of the article clamped.

In testimony whereof we affix our signatures in presence of two witnesses.

DANIEL P. JEFFERIES.
ARTHUR W. GRANT.

Witnesses:
OLIVER H. MILLER,
H. M. PLAISTED.